(12) United States Patent
Luo

(10) Patent No.: US 11,869,145 B2
(45) Date of Patent: Jan. 9, 2024

(54) INPUT DEVICE MODEL PROJECTING METHOD, APPARATUS AND SYSTEM

(71) Applicant: Beijing Source Technology Co., Ltd., Beijing (CN)

(72) Inventor: Zixiong Luo, Beijing (CN)

(73) Assignee: Beijing Source Technology Co., Ltd., Beijing (CN)

( * ) Notice: Subject to any disclaimer, the term of this patent is extended or adjusted under 35 U.S.C. 154(b) by 0 days.

(21) Appl. No.: 18/209,471

(22) Filed: Jun. 13, 2023

(65) Prior Publication Data

US 2023/0326130 A1 Oct. 12, 2023

Related U.S. Application Data

(63) Continuation of application No. PCT/CN2023/073666, filed on Jan. 29, 2023.

(30) Foreign Application Priority Data

Feb. 15, 2022 (CN) .......................... 202210137976.8
Feb. 15, 2022 (CN) .......................... 202210137977.2

(51) Int. Cl.
*G06T 17/00* (2006.01)
*G06T 7/70* (2017.01)
(Continued)

(52) U.S. Cl.
CPC ............... *G06T 17/00* (2013.01); *G06T 7/70* (2017.01); *G06V 10/44* (2022.01); *G06V 10/761* (2022.01); *H04N 5/74* (2013.01)

(58) Field of Classification Search
None
See application file for complete search history.

(56) References Cited

U.S. PATENT DOCUMENTS 11,402,871 B1 * 8/2022 Berliner ............... G06F 3/0489
2018/0197345 A1 7/2018 Xiong
(Continued)

FOREIGN PATENT DOCUMENTS

CN 105224069 A 1/2016
CN 106648093 A 5/2017
(Continued)

OTHER PUBLICATIONS

International Search Report issued in Application No. PCT/CN2023/073666, dated May 10, 2023,(5p).
(Continued)

*Primary Examiner* — Frank S Chen
(74) *Attorney, Agent, or Firm* — Arch & Lake LLP

(57) ABSTRACT

A method for projecting an input device, an electronic apparatus, and a non-transitory computer readable storage medium are provided. The method includes: identifying a three-dimensional (3D) model of an input device, wherein the input device comprises a keyboard and a mouse; acquiring an image of the input device captured by a camera in a virtual reality (VR) system; identifying at least one feature identifier of the input device in the image; calculating target information in the VR system corresponding to the at least one feature identifier; and projecting, according to the target information, the 3D model into a VR scene constructed by the VR system.

20 Claims, 8 Drawing Sheets

(51) Int. Cl.
   *H04N 5/74*    (2006.01)
   *G06V 10/74*   (2022.01)
   *G06V 10/44*   (2022.01)

(56) References Cited

U.S. PATENT DOCUMENTS

| | | | |
|---|---|---|---|
| 2021/0065455 A1* | 3/2021 | Beith | G06F 1/163 |
| 2021/0132683 A1* | 5/2021 | Herling | G02B 27/0093 |
| 2021/0233312 A1 | 7/2021 | Noris et al. | |
| 2022/0121343 A1* | 4/2022 | Ratter | G06F 3/0304 |
| 2022/0172397 A1* | 6/2022 | Herling | G06V 10/44 |

FOREIGN PATENT DOCUMENTS

| | | | |
|---|---|---|---|
| CN | 107357434 A | 11/2017 |
| CN | 109191590 A | 1/2019 |
| CN | 109445620 A | 3/2019 |
| CN | 109710056 A | 5/2019 |
| CN | 111833457 A | 10/2020 |
| CN | 111862333 A | 10/2020 |

OTHER PUBLICATIONS

First Search Report issued in Application No. CN202210137977.2, dated Mar. 14, 2022, (2p).

* cited by examiner

INPUT DEVICE MODEL PROJECTING METHOD, APPARATUS AND SYSTEM

CROSS-REFERENCE TO RELATED APPLICATIONS

This application is a continuation application of PCT/CN2023/073666 filed on Jan. 29, 2023, which claims priority to Chinese Patent Application No. CN202210137976.8 filed on Feb. 15, 2022 and Chinese Patent Application No. CN202210137977.2 filed on Feb. 15, 2022, the entire disclosures of which are incorporated herein by reference for all purposes.

TECHNICAL FIELD

The present disclosure relates to the field of data technology, and in particular, to input device model projecting methods, apparatus and systems.

BACKGROUND

At present, Virtual Reality (VR) is widely used. VR is to combine the virtual with the real to bring users an immersive experience. However, in projecting a real object to a virtual reality scene based on VR, a large amount of data about the object needs to be collected, resulting in a long mapping time. In addition, the existing method identifies an input device, such as a keyboard, by images, and it is required to analyze and determine the device type and model by identifying the overall shape image of the device. If the input device is partially blocked, the image captured will be incomplete, which will have a great impact on the identification of the existing method. As a result, the identification is not accurate or even invalid, and the fault tolerance for blocking is low, which further leads to the inaccurate positioning of the model in the virtual reality scene and poor user experience.

SUMMARY

To solve the technical problems described above, the present disclosure provides input device model projecting methods, apparatus, storage medium and system for accurately projecting the 3D model of the input device to the virtual reality scene, so as to facilitate subsequent interaction using the input device based on its 3D model in the virtual reality scene.

According to a first aspect of the present disclosure, an input device projecting method is provided. The method includes: identifying a three-dimension (3D) model of an input device, where the input device includes a keyboard and a mouse; acquiring an image of the input device captured by a camera in a virtual reality (VR) system; identifying at least one feature identifier of the input device in the image; calculating target information in the VR system corresponding to the at least one feature identifier; and projecting, according to the target information, the 3D model into a VR scene constructed by the VR system. Furthermore, the target information includes a position and an attitude.

Moreover, the method may further include calculating the target information in the VR system corresponding to the at least one feature identifier by: in response to determining that an amount of the at least one feature identifier is a first amount, acquiring images of a feature identifier captured simultaneously by at least two cameras at different angles and determining the attitude of the feature identifier based on the images of the feature identifier at the different angles; or in response to determining that the amount of the at least one feature identifier is a second amount, determining a roll angle and a pitch angle of a polygon formed by at least three non-conllinear feature identifiers based on a position of each feature identifier in the polygon and determining a yaw angle of the polygon according to an orientation of the polygon and a position relationship between the polygon and the 3D model, where the roll angle, the pitch angle and the yaw angle constitute the attitude of the polygon.

According to a second aspect of the present disclosure, an electronic apparatus is provided. The electronic apparatus includes one or more processors, a memory coupled to the one or more processors, a display device that is configured to display a VR scene, and a plurality of programs for projecting a VR model stored in the memory that, when executed by the one or more processors, cause the electronic apparatus to perform acts including: identifying a three-dimensional (3D) model of an input device, wherein the input device includes a keyboard and a mouse; acquiring an image of the input device captured by a camera in a VR system; identifying at least one feature identifier of the input device in the image; calculating target information in the VR system corresponding to the at least one feature identifier; and projecting, according to the target information, the 3D model into a VR scene constructed by the VR system. Furthermore, the target information includes a position and an attitude.

Moreover, the electronic apparatus may be caused to calculate the target information in the VR system corresponding to the at least one feature identifier by: in response to determining that an amount of the at least one feature identifier is a first amount, acquiring images of a feature identifier captured simultaneously by at least two cameras at different angles and determining the attitude of the feature identifier based on the images of the feature identifier at the different angles; or in response to determining that the amount of the at least one feature identifier is a second amount, determining a roll angle and a pitch angle of a polygon formed by at least three non-conllinear feature identifiers based on a position of each feature identifier in the polygon and determining a yaw angle of the polygon according to an orientation of the polygon and a position relationship between the polygon and the 3D model, where the roll angle, the pitch angle and the yaw angle constitute the attitude of the polygon.

According to a third aspect of the present disclosure, a non-transitory computer readable storage medium is provided. The medium stores a plurality of programs for execution by an electronic apparatus having one or more processors, wherein the plurality of programs, when executed by the one or more processors, cause the electronic apparatus to perform the method according to the first aspect.

According to a fourth aspect of the present disclosure, a virtual reality system is provided. The VR system includes a display device configured to display a virtual reality scene and projected 3D model and a plurality of cameras configured to capture images of an input device.

Furthermore, the virtual reality system includes the electronic apparatus coupled with the one or more processors, memory coupled to the one or more processors and a plurality of programs for projecting a 3D model stored in the memory that, when executed by the one or more processors, cause the electronic apparatus to perform the steps according to the first aspect to display the 3D model in the VR scene.

DETAILED DESCRIPTION

Figure 1:
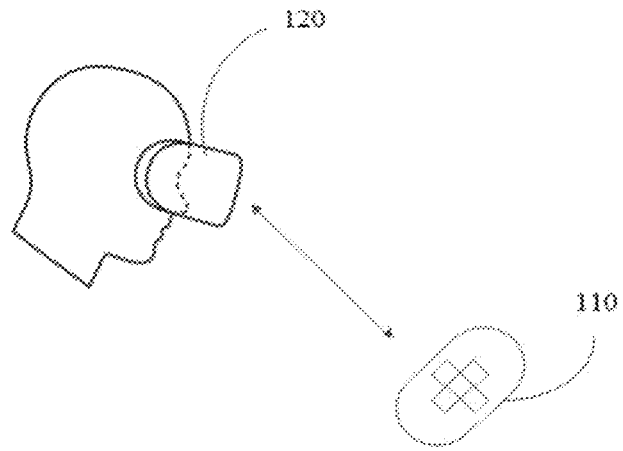
FIG. 1 illustrates a schematic diagram of an application scene provided in accordance with some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

For making it convenient for those skilled in the art to understand, multiple implementation modes are listed in the embodiments of the disclosure to describe the technical solutions of the embodiments of the disclosure clearly. Of course, those skilled in the art can understood that multiple embodiments provided in the embodiments of the disclosure can be executed independently, or can be combined with methods of the other embodiments in the embodiments of the disclosure for execution together, or may be executed independently or after combined with some methods in other related technologies. No limits are made thereto in the embodiments of the disclosure.

In this disclosure, a virtual reality (VR) is a computer-generated environment that displays scenes and objects that appear to be real, making the user feel they are immersed in their surroundings.

In this disclosure, virtual reality systems typically use either virtual reality headsets or multi-projected environments to generate realistic images, sounds and other sensations that simulate a user's physical presence in a virtual environment.

In this disclosure, a virtual reality scene refers to a scene generated by a VR system or a VR device where the user can move or interact with the virtual world.

In this disclosure, a 3D model represents a body of an object in a three-dimensional (3D) space. Especially, a 3D model of an input device in a virtual reality scene refers to a body of the input device in the virtual reality scene, which is a 3D space constructed by a virtual reality system.

The projecting method in this disclosure is interchangeable with or can also be described as mapping method. The word "projecting" is interchangeable with or can also be described as the word "mapping." And the word "project" is interchangeable with or can also be described as the word "map" in circumstances understandable to a person skilled in the art.

The term "position" in the present disclosure is interchangeable with or can also be described as the word "position information," "location," "location information." And the term "attitude" in the present disclosure is interchangeable with or can also be described as the word "attitude information."

The term "virtual reality system" in the present disclosure is interchangeable with or can also be described as the word "virtual reality software system."

The term "first amount" in the present disclosure is interchangeable with or can also be described as the term "first preset number." The term "second amount" in the present disclosure is interchangeable with or can also be described as the term "second preset number."

Currently, in a virtual reality system, the interaction between a user and a virtual reality scene is usually realized through the controller lever. Virtual reality system includes virtual reality equipment and virtual reality software. Virtual reality equipment can be controller levers, mouses, keyboards, head-mounted displays, and mainframes connected to a head-mounted display, etc. virtual reality system can include an operating system, software algorithm for image identification, software algorithm for spatial calculation and rendering software for virtual reality scene rendering (the rendered virtual reality scene is displayed on the display screen of the head-mounted display). The virtual reality system can be configured on the head-mounted display, and the head-mounted display device can be directly connected to the camera and keyboard, thus it can be understood as an all-in-one machine. The virtual reality system can also be configured on a mainframe connected to a head-mounted display, with a camera and keyboard connected to the mainframe, thus it can be understood as a split unit. As shown in FIG. 1, a schematic diagram of an application scene provided in the present disclosure includes a control lever 110 and a head-mounted display 120. In the following embodiments, the operation of a virtual reality system (all-in-one machine) on the head-mounted display 120 will be an example. The implementation of the method in the present disclosure by the virtual reality system running on the mainframe connected to the head-mounted display is the same as running on the all-in-one machine above and will not be repeated here. The control lever 110 is connected to the head-mounted display 120. The head-mounted display 120 includes a display screen and the virtual reality system. The virtual reality system can receive and process the input signal from the control lever 110, and then displays the corresponding content of the processing result on the display screen. The scene displayed on the display screen can be called a virtual reality scene. The control lever 110 can be a control lever with a position tracking function and can be configured with simple keys such as direction keys and enter keys. Users can hold one controller lever 110 with each hand or one controller lever 110 with one hand, and click on the keys on the control lever 110 and drag and move the control lever 110 to perform interactive operations such as clicking on and dragging interfaces and objects in the virtual reality scene constructed by the head-mounted display 120. When it is necessary to input text in the virtual reality scene constructed by the head-mounted display 120, a virtual interface with a keyboard layout can be displayed in the virtual reality scene constructed by the head-mounted display 120, and then users can use the control lever 110 to click on the virtual keys on the virtual keyboard interface for input including character (i.e., letters, numbers, etc.) symbol, etc. However, the virtual keyboard in the virtual reality scene constructed by the head-mounted display 120 does not correspond to the control lever 110. When users input into the virtual reality scene constructed by the head-mounted display 120 through the control lever 110, they can only click on virtual keys on the virtual keyboard interface to input characters (i.e., letters, numbers, etc.), or symbols one by one, which is cumbersome and inconvenient. For example, the speed and efficiency of text input are also low, which ultimately leads to the low efficiency and inflexibility of the virtual reality scene constructed by the head-mounted display 120. In addition, the corresponding 3D model of the mouse is not displayed in the virtual reality scene, so users cannot understand the use of the mouse in real space by watching the virtual reality scene, so as to control the mouse in real space to achieve other complex operations in daily use of the mouse. The operation is inconvenient and does not conform to the daily use of the mouse, and the efficiency of interaction is low.

To address the above technical problems, the present disclosure provides input device model projecting methods of using an input device (a keyboard or a mouse) in real space to realize the interaction with the head-mounted display device.

One disclosed embodiment includes determining the 3D model of the input device, acquiring the image of the input device captured by the camera installed in the virtual reality system, identifying at least one feature identifier in the image, obtaining the target information corresponding to at least one feature identifier in the virtual reality, and then projecting the 3D model into a virtual reality scene constructed by the virtual reality system. The method in this embodiment is that users can control the input device based on the 3D model in virtual reality and complete the interaction between the input device and the virtual reality scene efficiently and rapidly. In particular, the input device model projecting method is described in detail through one or more examples below.

Figure 2:
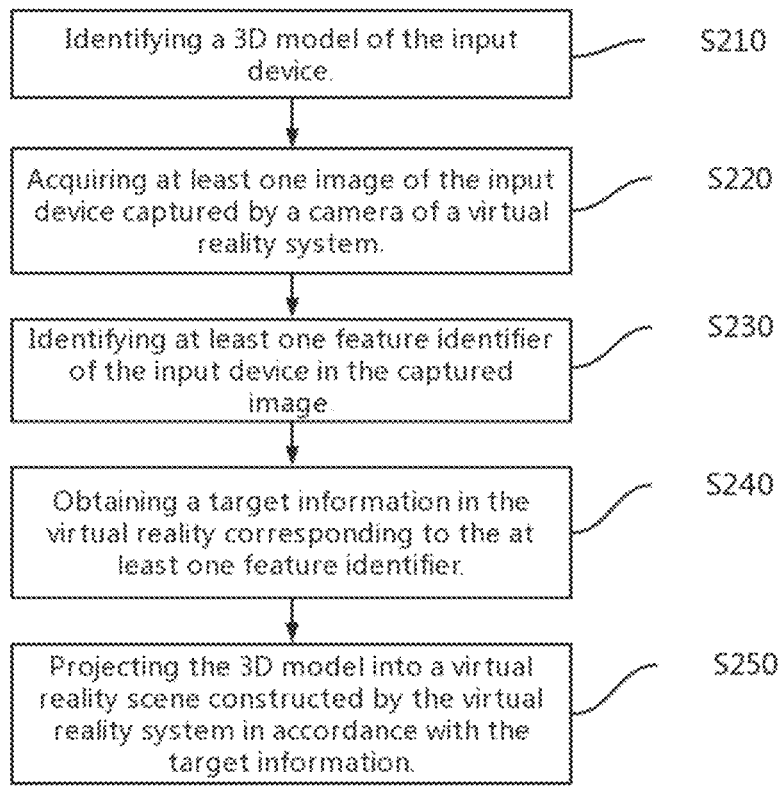
FIG. 2 illustrates a flow diagram of an input device model projecting method provided in one embodiment.

FIG. 2 illustrates a flow diagram of an input device model projecting, or mapping, method provided in this disclosed embodiment for one application scene. In particular, the method includes the following steps S210 to S250 shown in FIG. 2.

A virtual reality system can be configured on the head-mounted display, and can process the data received from the keyboard, mouse or other input devices and return the processing result to the display screen of the head-mounted display. Refer to the application scene of a keyboard shown in FIG. 3A and the application scene of a mouse shown in FIG. 3D for details. The display screen will change the display state of each object in the virtual reality scene according to the processing result.

Figure 3A:
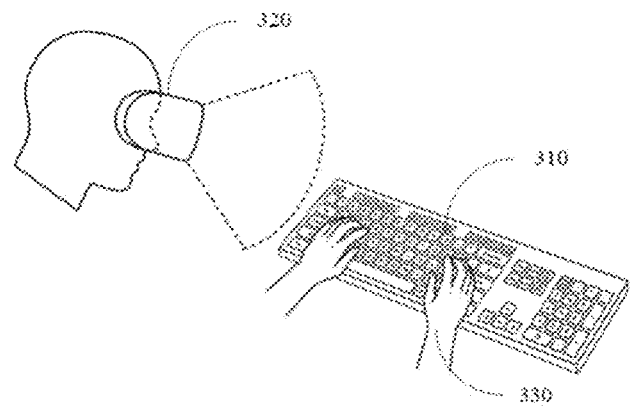
FIG. 3A illustrates a schematic diagram of another application scene provided in accordance with some embodiments.
Figure 3B:
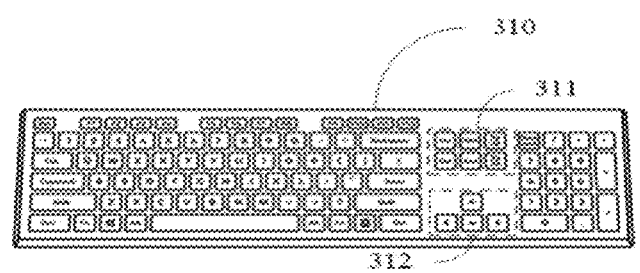
FIG. 3B illustrates a schematic diagram of a keyboard provided in accordance with some embodiments.
Figure 3C:
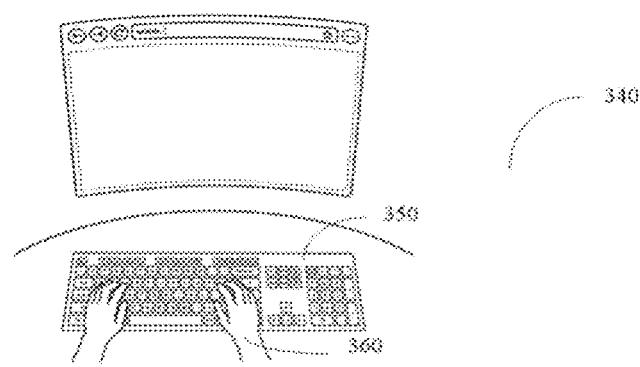
FIG. 3C illustrates a schematic diagram of a virtual reality scene provided in accordance with some embodiments.

In some examples, FIG. 3A illustrates a schematic diagram of another application scene provided in the present disclosure. FIG. 3A includes the keyboard 310, the head-mounted display 320 and the user hands 330. The head-mounted display 320 is on the user's head, and the keyboard 310 is operated by the hands 330. The layout of keys on the keyboard 310 is as shown in FIG. 3B, and 340 in FIG. 3C shows the scene constructed within the virtual reality system running on the head-mounted display 320 shown in FIG. 3A. It is understandable that after wearing the head-mounted display, users can see the virtual reality scene constructed by the virtual reality system running on the head-mounted display 320 with their eyes, but they cannot see objects in real space and operate on them. To interact with the virtual reality scene, devices are usually simple levers or other hand devices that only have several simple keys that can be operated without eyes. Those keys always include direction keys, enter key and joystick, etc. Operating without eyes on the keys makes accurate operation impossible when the input device has many keys, such as the keyboard 310.

Given the problems in the interaction between the users and the virtual reality scene mentioned above, the method provided in the present disclosure can be used to project the corresponding 3D model 350 of the keyboard 310 to the virtual reality scene 340 displayed on the head-mounted display 320 based on the spatial position and attitude of the keyboard 310 in real space, so that users can understand and control the keyboard 310 by watching the 3D model 350 of the keyboard 310 displayed in the virtual reality scene 340, and can see the operation of the 3D model 350 of the keyboard 310 by the 3D model 360 of the user hands 330 in the virtual reality scene 340. The operation in the virtual reality scene 340 can be synchronized to a certain extent with the actual operation of the physical keyboard 310 by the user's hands 330, so as to achieve efficient and rapid text input. It is equivalent to that users can directly see the keys on the physical keyboard with their eyes and perform subsequent operations, and can accurately determine the position of the corresponding model of the keyboard in the virtual reality scene based on a small amount of data. As the positioning is relatively accurate, user experience is improved.

Figure 3D:
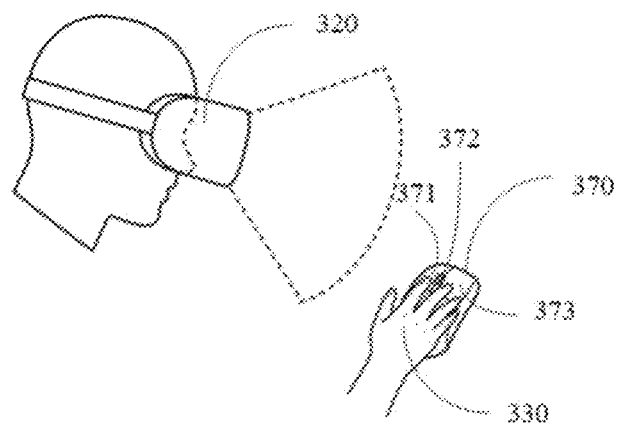
FIG. 3D illustrates a schematic diagram of another application scene provided in one disclosed embodiment.
Figure 3E:
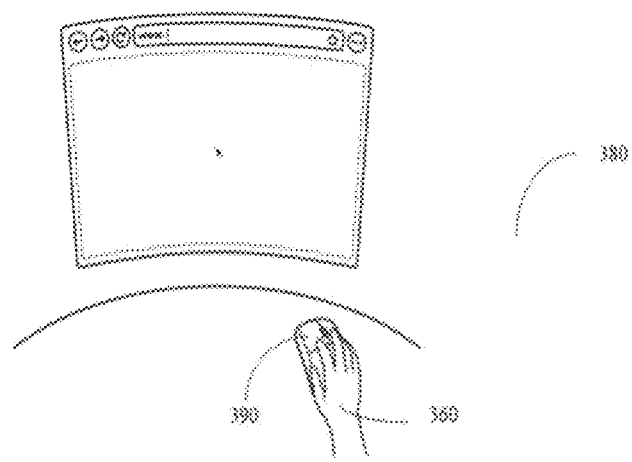
FIG. 3E illustrates a schematic diagram of another virtual reality scene provided in one disclosed embodiment.

In some examples, as shown in FIG. 3D, a schematic diagram of another application scene provided in this disclosed embodiment, includes the mouse 370, the head-mounted display 320 and the user hands 330. The head-mounted display 320 is on the user's head, the mouse 370 is operated by the hands 330, and 380 in FIG. 3E illustrates the scene constructed within the head-mounted display 320 shown in FIG. 3D, which can be called virtual reality scene 380. It is understandable that after wearing the head-mounted display, users can see the virtual reality scene constructed by the head-mounted display 320 with their eyes, but they cannot see objects in real space and operate on them. To interact with the virtual reality scene, devices are usually simple levers or other hand devices that only have some keys that can be operated without eyes, such as direction keys, enter key and joystick. Interaction with the virtual reality scene is not applicable to devices with complex functions. For example, it is impossible to operate accurately on a mouse that has many keys to achieve the corresponding functions of complex operations in the mouse.

Given problems in the interaction between the users and the virtual reality scene, the method provided in this disclosed embodiment can be used to project the 3D model 390 of the mouse 370 to the virtual reality scene 380 displayed on the head-mounted display 320 based on the spatial position and attitude of the mouse 370 in real space, so that users can understand and control the mouse 370 by watching the 3D model 390 of the mouse 310 displayed in the virtual reality scene 380, and can see the operation of the corresponding 3D model 390 of the mouse 370 by the corresponding 3D model 360 of the user hands 330 in the virtual reality scene 380. FIG. 3E also illustrates an operation interface, which is similar to the display screen of a terminal. The operation in the virtual reality scene 380 can be synchronized to a certain extent with the actual operation of the mouse 370 by the user's hands 330. The method provided in this disclosed embodiment is applicable to not only the above application scenes. In the following examples, the keyboard is taken as the input device.

S210 includes determining the 3D model of the input device. Alternatively, determining the 3D model of the input device includes: acquiring configuration information of the input device, including model information; determining the corresponding 3D model of the input device according to the model information.

In some examples, the virtual reality system acquires the configuration information of the keyboard, including the model information. The layout, content, and distance between functional areas are different for different models of the keyboard. Functional areas can also be understood as key areas distributed on the keyboard; each key area contains different keys that contain different characters (i.e., letters, numbers, etc.) or symbols and the distance between key areas is different. Then the corresponding 3D model of the physical keyboard is selected based on its model. The 3D model can be selected from a pre-built model database after comparing the model information or identified as the 3D model that has a similar distribution of key area on the keyboard. In general, the physical keyboard is divided into the main keyboard area (including letter keys, space key, enter key and other function keys), direction key area (including 4 direction keys with arrows indicating up, down, left and right), control key area (including 6 function keys such as Insert and PageDown), number key area (including 17 function keys such as number keys and enter key) and top function key area (including 13 function keys such as Esc key and F12). These different keys in different areas may contain different characters (i.e., letters, numbers, etc.) different symbols, etc., e.g., characters on the character keys, arrows indicating up, down, left and right on 4 direction keys, Insert and PageDown on the 6 function keys, numbers and enter on the 17 function keys, function symbols such as Esc, F12, etc.). The layout and position relation of keys in each key area (function area) of the physical keyboard of each model are standard and determined, as is the relative position relation between different key areas. For example, the common physical keyboard 310 shown in FIG. 3B includes the control key area 311 and the direction key area 312, etc. The number key area is located at the far right of the keyboard, that is, the right of the control key area 311 and the direction key area 312. Direction key area 312 and control key area 311 are distributed up and down, and the relative position relation between key areas is determined. Keys corresponding to numbers 1 to 9 are distributed from bottom to top and left to right in the number key area, and the layout of keys in each key area (function area) is determined. The number 1 is in front of the number 2, and the position relation between keys is determined. In the direction key area 312, the key indicating the down direction is below the key indicating the up direction, the key indicating the left direction is on the left of the key indicating the down direction, and the key indicating the right direction is on the right of the key indicating down direction. The relative position relation between keys in the direction key area 312 is determined.

In some examples, the input device may include a mouse. For example, the virtual reality system acquires the configuration information of the mouse, including the model information. The distribution and distance between components are different for different models of the mouse; the component may be a key or identifier set on the mouse, with keys including left key, right key, wheel and side key, and identifiers including logo of the mouse and identifier preset on the mouse. Then the corresponding 3D model of the mouse is selected based on its model. The 3D model can be selected from a pre-built model database after comparison and analysis to determine the corresponding exact 3D model of the mouse or identified as the 3D model with a similar distribution of the components in the mouse. Keys and the wheel in the mouse are taken as examples below. The situation where there are both keys and identifiers is similar and will not be repeated here. In general, a mouse has 3 components, including a left key, a right key and a wheel. There are also mice with multiple keys, such as 4 keys, 5 keys, etc. The more keys there are in the mouse, the more complex the operation will be and the more functions will be realized, so the relevant interaction method will not be applicable. The position relation between keys of the mouse of each model is standard and determined. For example, the common mouse 370 shown in FIG. 3D includes the left key 371, the right key 373 and the wheel 372. The wheel 372 is adjacent to the left key 371 and the right key 373, the relative position relation between keys is determined, and the spatial distance among the left key 371, the wheel 372 and the right key 373 is determined.

Alternatively, determining the corresponding 3D model of the input device according to the model information includes: if there is the same model as that of the input device in the preset database according to the model information, determining the corresponding 3D model of the input device based on the model in the preset database. Or, if there is no same model as that of the input device in the preset database, calculating the similarity between the model stored in the preset database and the model of the input device, and determining whether the similarity is less than or equal to the preset value. If yes, determining the corresponding 3D model of the input device based on the model corresponding to the similarity in the preset database. If the similarity is bigger than the preset value, determining the target model in the preset database.

After the model information of the keyboard is acquired, whether there is the same model as the input keyboard in the preset database is determined. Corresponding 3D models of different keyboards are prestored in the preset database. For example, the model of the keyboard can be AAAA, and the corresponding 3D model of the keyboard in the preset database is also AAAA. If there is a model the same as the keyboard in the preset database, the 3D model in the virtual reality scene can be directly determined as the corresponding 3D model of the keyboard in the preset database, thus further reducing the interaction time. Determining the target model when the mouse is the input device is the same as that when the keyboard is the input device, so such determination will not be repeated here.

If there is no same model as the input keyboard in the preset database, that is, the model information of the input keyboard cannot match any of the keyboards in the preset database, the similarity between the model stored in the preset database and the model of the input device should be further calculated. Whether the similarity is less than or equal to a preset value should be determined. The purpose of the calculation and the comparison is the figure out whether there is a model similar to the input keyboard in the preset database. Similar keyboard models have similar layouts, and the rules for determining similar models can be preset. For example, AAAA and AAAB can be set as similar models. Keyboards of models AAAA and AAAB have similar layouts, and the matching degree is relatively high. Model AAAA contains 4 keys, and model AAAB also contains 4 keys. The positions of 3 keys in AAAA and AAAB are the same and the keys in such positions are also the same, i.e., A, and only the fourth key is different. Therefore, it can be calculated that the similarity between the two models is 0.25. The preset value can be set to 0.4 as required. Since the similarity 0.25 is less than the preset value 0.4, it can be determined that there is a model similar to the input keyboard in the preset database. Then, the corresponding 3D model of the model AAAA can be determined based on the model AAAB which corresponds to the similarity lower than the preset value. Only one similar 3D model is required to be stored in the preset database to reduce the occupied storage space and associate similar models directly. If there is a model similar to the input keyboard in the preset database, the corresponding 3D model of the keyboard can be directly determined based on the similar model.

If the similarity is bigger than the preset value, that is, no model in the preset database is the same as or similar to the input keyboard, the target model should be determined in the preset database. The target model can be a generic model prestored in the preset database, or a keyboard-like 3D model selected in the preset database.

S220 includes acquiring the image of the input device captured by the camera of the virtual reality system. The camera can be an infrared camera, a color camera, or a grayscale camera. For example, images with a black background and white keys can be generated when captured with a grayscale camera, and images including keyboards captured in real time by the camera mounted on the head-mounted display in the virtual reality system can be acquired. The black background is the overall background of the keyboard, and the white keys may represent keys with the characters, which facilitates the subsequent rapid and accurate binary classification and identification of the characters in the images. Particularly, images including the keyboard 310 can be captured by the camera mounted on the head-mounted display 320 shown in FIG. 3A and transmitted to the virtual reality system for processing. The virtual reality system acquires the image of the mouse captured by the camera in real time. The structure between the keys and the wheel in the mouse image is clear, and the gap between the keys can be distinguished. That facilitates the subsequent rapid and accurate identification of keys on the mouse, and the accurate identification of the areas where the left key, the right key and the wheel of the mouse reside in the image.

S230 includes identifying at least one feature identifier of the input device in the image. Alternatively, the input device includes a keyboard, and the feature identifier of the keyboard is a key. In some examples, the feature identifier of the keyboard is a key with a character (e.g., a letter, a number, etc.) or a key with a symbol (e.g., a symbol of arrow indicating up/down/left/right, etc.). The input device also includes a mouse, and the feature identifier of the mouse is a key that is corresponding to a component. On the basis of S220 above, the virtual reality system can identify at least one key on the keyboard in the image based on the image identification algorithm, and can identify the white keys in the black and white image acquired above, or identify the keys with obvious color differentiation, so as to improve the identification speed. In some examples, 3 keys with 3 characters in any of the 5 key areas mentioned above can be identified. Those 3 keys may not be in a horizontal line. For example, the 3 keys can be A, W and D in the same key area, or F3, M and N in different key areas. The selection of the 3 keys is not restricted. The image identification algorithm can be an algorithm having a character/key identification function, and is not restricted here. The virtual reality system can identify at least one component on the mouse in the image based on the image identification algorithm. Particularly, the three keys on the mouse can be identified: left key, right key and wheel.

Alternatively, if the similarity is bigger than the preset value and the target model applies, at least one key in each preset area of the keyboard in the image should be identified.

If the similarity is bigger than the preset value, that is, no model in the preset database is the same as or similar to the input keyboard, a 3D model similar to the model of the keyboard or a generic 3D model (target model) can be selected. This could happen if the input keyboard has uncommon layouts. For example, keyboards with 87 keys, or keyboards which contain two or more separate parts are quite uncommon compared with the normal 104 keys keyboard. A similar 3D model is taken as an example below. Keys should be identified in each of the five preset areas of the keyboard in the image. The preset areas can be the five keyboard areas and at least one key should be identified in each area. For example, a key with number/character 4 is identified in the number key area, a key with character A in the main keyboard area, a direction key up in the direction key area, Insert in the control key area and F12 in the top function key area. Then a similar 3D model can be adjusted according to the position of keys with characters or symbols in each key area of the keyboard, or a similar 3D model can be directly used as the 3D model matching the keyboard.

S240 includes obtaining the target information corresponding to the at least one feature identifier in the virtual reality. On the basis of S230 above, after determining the at least one key of the keyboard in the image, the virtual reality system calculates the target information corresponding to the at least one key in the virtual reality. The target information includes a position and a direction (an attitude).

In some examples, the head-mounted display 320 shown in FIG. 3A will be equipped with 3-4 cameras to capture real time information about the environment around the user's head, and determine the position relation between the captured environment and the head-mounted display and construct a space, which can be called the target space. The keyboard and the user's hands are within the determined target space. The target information of at least one key on the keyboard is calculated within the target space, that is, the target information of the key within the target space. Position refers to the spatial three-dimensional coordinates (XYZ) of a key in the target space. Direction information refers to the attitude of the key in the target space, such as the rotation angle, pitch angle, and roll angle of the key in the target space. Spatial three-dimensional coordinates refer to the three-dimensional coordinates within the target space. Attitude refers to the attitude within the target space. Through the target information of the above keys, the position and attitude of the keys within the target space can be determined. This embodiment uses 3 to 4 cameras to capture images of the environment. However, the number of cameras is not fixed and could be changed under different working requirements. If the information required to build a 3D model is simple, the number of cameras could be reduced to 2. By contrast, if the information required is relatively complicated, the number of cameras could be increased.

Alternatively, obtaining the target information of the at least one feature identifier includes obtaining the target information corresponding to the at least one feature identifier in the virtual reality through spatial position algorithm.

On the basis of S230 above, the target information of each key on the keyboard in the target space can be calculated through the spatial position algorithm, which can be an algorithm for resolving the relative motion of points in two-dimensional space and three-dimensional space (Perspective-n-Point/PnP).

Alternatively, obtaining the target information corresponding to at least one feature identifier in the virtual reality includes: for the first preset amount of feature identifiers, acquiring the image of the same feature identifier captured simultaneously by at least two cameras from different angles, and determining the attitude of the same feature identifier based on the image of the same feature identifier at different angles; Or, for the second preset amount of feature identifiers, determining the roll angle and pitch angle of the polygon, which is formed by at least three feature identifiers, based on the position of the said the at least three non-collinear feature identifiers. Determining the yaw angle of the polygon based on the orientation of the polygon and the position relation between the polygon and the 3D model. The roll angle, pitch angle and yaw angle constitute the attitude of the polygon.

The target information includes position and attitude. After the position of the feature identifier in the virtual reality is determined, the attitude of the feature identifier in the virtual reality should be calculated. Particularly, for the first preset amount of feature identifiers, wherein the first preset amount is either 1 or 2, 1 feature identifier is taken as an example. For acquiring the image of the same feature identifier captured simultaneously by at least two cameras of the virtual reality system from different angles, the same feature identifier can be the key with character A on the keyboard. Therefore, it is to use two cameras to capture images including character A simultaneously from different angles, and determine the attitude of the same feature identifier based on the image of the same feature identifier from different angles, that is, determining the attitude of character A. It is understandable that the attitude of a feature identifier in images captured at two or more different angles can be determined, with the specific implementation method not repeated here. Or, for the second preset amount of feature identifiers, wherein the second preset amount is at least 3, with the keyboard taken as an example, the roll angle and pitch angle of the polygon (triangle AWC) formed by three feature identifiers can be determined based on the position of three feature identifiers that are not in a straight line (which can be A, W and C). Three points define a triangle, and the roll angle and pitch angle of the triangle can be determined. Then the yaw angle of the triangle can be determined based on the orientation of the triangle formed by three feature identifiers. For example, if the orientation is that W is diagonally above A and A is diagonally above C in the triangle AWC, the yaw angle of the triangle formed by three points can be determined. The roll angle, pitch angle and yaw angle constitute the attitude of the triangle. The front of the keyboard or mouse can be predefined to be positive, and the back to be negative so that the roll angle, pitch angle and yaw angle can be positive or negative and the attitude of the triangle can be determined more accurately. The method provided in the present disclosure can accurately determine the position and the attitude of the model in the virtual reality scene by collecting at most 3 feature identifiers, and then accurately displaying the complete 3D model to realize the interaction between the virtual and the real. The method in some embodiments have high fault tolerance for blocking. Even if there is blocking, the process and accuracy of model projecting will not be affected as long as fewer feature identifiers can be identified. There is no need to identify the complete shape of the object, and the implementation is relatively easy.

S250 includes projecting the 3D model into the virtual reality scene corresponding to the virtual reality system based on the target information. On the basis of S240 and S210 above, the 3D model can be projected into the virtual reality scene constructed by the virtual reality system based on the target information of each key, that is, the corresponding 3D model of the keyboard as determined in S210 can be displayed in the virtual reality scene constructed by the virtual reality system. In the virtual reality scene, the position and the attitude of the 3D model in the target space are the same as those of the keyboard (physical keyboard) in real space. Users can determine the situation of the physical keyboard in real space based on the state of the 3D model in the virtual reality scene displayed on the display screen of the head-mounted display, and then control the physical keyboard to achieve rapid text input or other functions.

Alternatively, S250 above includes: determining the position and the attitude of the 3D model based on the target information and the position relation between at least one feature identifier and the 3D model; projecting the 3D model into the virtual reality scene corresponding to the virtual reality system based on the position and the attitude of the 3D model.

The target information of the whole 3D model in the virtual reality, which is the position and the attitude of the 3D model in the virtual reality, can be determined based on the calculated target information of each key and the position of each key on the corresponding 3D model of the keyboard (the position relation between at least one feature identifier and the 3D model). The calculated target information of each key is within the constructed target space, and the position of each key on the corresponding 3D model of the keyboard is fixed or can be determined. The position of each key on the corresponding 3D model of the keyboard includes the spatial distance between keys with characters and the relative position of each key, as well as the spatial distance between a key and a preset identifier and the relative position of the key to the preset identifier. A preset identifier can be set up in advance on the keyboard. There is no restriction on the position of preset identifiers on the keyboard. For example, preset identifiers can be white dots. The distance between keys on the corresponding 3D model of the keyboard of each model and the direction of each key are fixed. For example, regardless of the position and attitude of the 3D model, the spatial distance between a key with character A and a key with character W is fixed, and the relative position of the key with character W above the key with character A is also fixed, that is, the target information of the whole 3D model in the virtual reality can be determined based on the calculated target information of characters and the position of characters on the 3D model. Then the 3D model can be displayed at the target information of the 3D model in the virtual reality scene, which can also be understood as the real, accurate and rapid projecting of the physical keyboard in reality to the virtual reality scene.

Alternatively, determining the position and attitude of the 3D model based on the target information and the position relation between at least one feature identifier and the 3D model includes: determining the position of the 3D model based on the position of a feature identifier and the position relation between the feature identifier and the 3D model.

The position of the 3D model in the target space can be determined based on the position of a feature identifier in the target space and the position relation between the feature identifier and the 3D model. The position relation between the feature identifier and the 3D model can be understood as the specific position of the feature identifier in the 3D model. For example, the key "Esc" usually located at the top right corner of the keyboard. According to the position information of the key "Esc" and its position relation with the entire keyboard, the position of the 3D model could be determined.

Alternatively, determining the position and attitude of the 3D model based on the target information and the position relation between at least one feature identifier and the 3D model includes: for the first preset amount of feature identifiers, determining the attitude of the 3D model based on the attitude of a feature identifier and the position relation between the feature identifier and the 3D model. For the second preset amount of feature identifiers, determining the attitude of the 3D model based on the attitude of the polygon and the position relation between the polygon and the 3D model.

Determining the position and attitude of the 3D model based on the target information and the position relation between at least one feature identifier and the 3D model includes: for the first preset amount of feature identifiers, such as character A or B mentioned above, determining the attitude of the 3D model in the virtual reality based on the attitude of the feature identifier and the position relation between the feature identifier and the 3D model. This means that based on the attitude of character A in the virtual reality and the position of character A on the 3D model, so that the attitude of the 3D model in the virtual reality can be calculated.

For the second preset amount of feature identifiers, the attitude of the 3D model in the virtual reality can be calculated based on the position of non-collinear keys with characters A, W and C on the 3D model of the keyboard and the calculated attitude of these characters in the virtual reality. Then the corresponding 3D model of the keyboard can be projected into the virtual reality scene corresponding to the virtual reality system based on the position and the attitude of the 3D model.

The hand location of the user's hands can also be acquired. Such information includes the position and attitude of the hands within the target space. Then the 3D model of the hands can be constructed and projected into the virtual reality scene displayed on the display screen of the head-mounted display at the locating information. At this point, the target information of the 3D model of the hands corresponds to that of the keyboard in the virtual reality scene. For example, for the position correspondence between the physical keyboard 310 and the hands 330 in reality shown in FIG. 3A, the hands 330 can operate the keyboard 310, and in the virtual reality scene 340, the corresponding 3D model 350 of the keyboard and the corresponding 3D model 360 of the hands can be displayed in the same display state. The display state can also be that the corresponding 3D model 350 of the keyboard is operated by the corresponding 3D model 360 of the hands.

The physical keyboard can be moved at any time, and the images including the physical keyboard captured by the camera are generated in real time. The target information of the 3D model of the physical keyboard in the virtual reality can be determined in real time, that is, the display state of the 3D model in the virtual reality scene can be changed in real time. If the physical keyboard is not replaced after the 3D model is determined for the first time, there will be no need to select the 3D model repeatedly according to the model of the physical keyboard. The target information of keys can be calculated directly so as to speed up the determination of the target information of the 3D model.

An input device model projecting method provided in this disclosed embodiment includes: determining the corresponding 3D model of the input device, acquiring the image of the input device captured by the camera of the virtual reality system, then identifying at least one feature identifier of the input device in the image, obtaining the target information corresponding to at least one feature identifier in the virtual reality, and finally, projecting the 3D model into the virtual reality scene based on the target information. The method provided in this embodiment requires fewer feature identifiers to project the input device in real space accurately to the virtual reality scene and has a high fault tolerance for blocking, so as to facilitate subsequent efficient interaction using a real input device according to the 3D model of the input device in the virtual reality scene, and complete text input and other operations rapidly.

Figure 4:
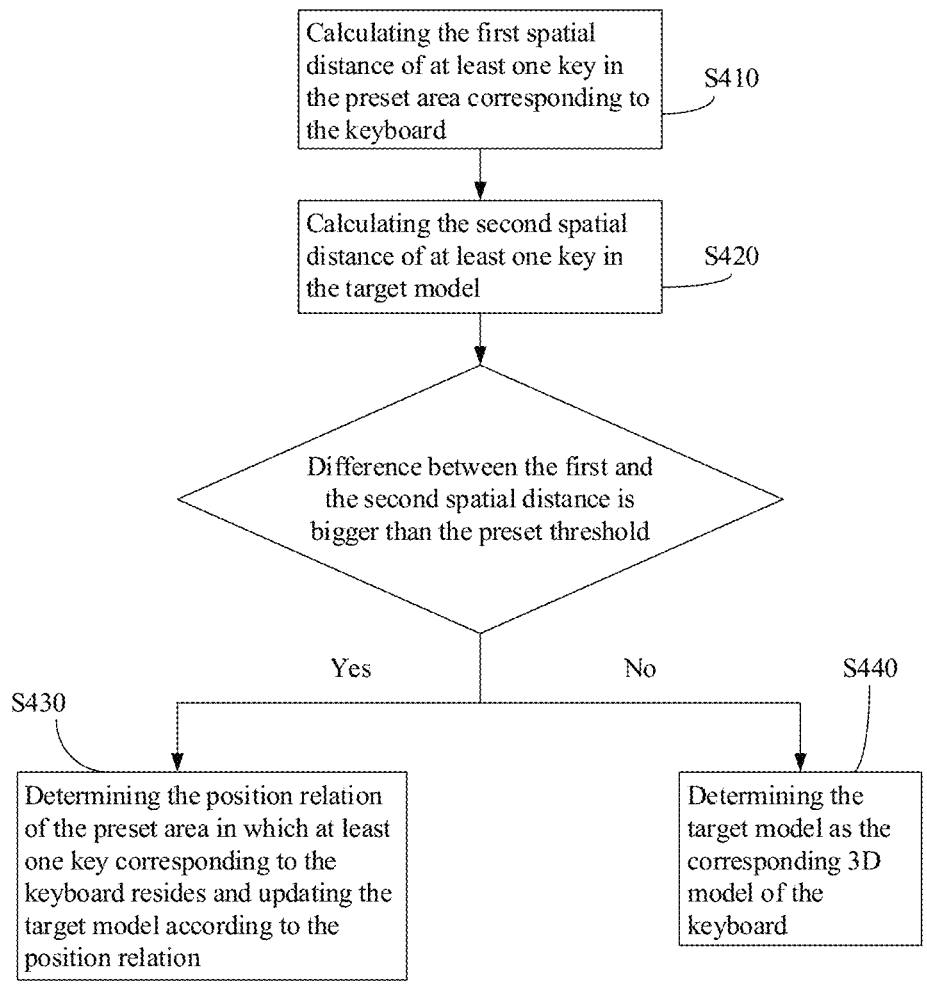
FIG. 4 illustrates a flow diagram of an input device model projecting method provided in one disclosed embodiment.

On the basis of the embodiment above, FIG. 4 illustrates a flow diagram of an input device model projecting method provided in the first disclosed embodiment. Alternatively, after at least one key in the preset area corresponding to the keyboard in the image is identified, the input device model projecting method also includes the following steps S410 to S440 shown in FIG. 4.

S410 includes calculating the first spatial distance of at least one key in the preset area corresponding to the keyboard. For example, the first spatial distance is between two keys in the preset area corresponding to the keyboard. After at least one key is identified in each of the 5 preset key areas, that is, after one key is identified in each key area, the spatial distance among 5 keys with 5 characters in 5 key areas can be calculated, such as the first spatial distance between a key with character/number 4 in the number key area and character A in the main keyboard area, between character Insert and character A, and between other keys, which will not be repeated here. Although the example here only identifies one key in each preset area and calculates the distance between them, it is possible to identify two or more keys in each area and calculate the distance. Identifying more keys could increase the accuracy of calculation and thus make the projecting more accurate.

If a mouse is the input device, and there are multiple components in the mouse, 3 or all components can be identified to ensure the accuracy of subsequent determination of the target information of the 3D model, i.e., the left key, the right key and the wheel. After at least one component of the mouse in the image is identified, if there are 5 components in the mouse, the 5 components can be left key 1, left key 2, wheel, right key 1 and right key 2. At this point, the 5 components of the mouse in the image can be identified, that is, each component of the mouse can be identified. Then a similar 3D model (target model) can be adjusted based on the position (spatial distance and relative position relation) of each component determined on the corresponding 3D model of the mouse so that the 3D model matching the mouse can be acquired.

S420 includes calculating the second spatial distance of the at least one key in the target model. For example, the second spatial distance is between two keys in the target model.

According to the key identified in each key area as determined above, the second spatial distance from the same key above can also be calculated in 5 key areas of the target model (similar 3D model) accordingly, such as the second spatial distance between the key with number/character 4 in the number key area and the key with character A in the main keyboard area, and between keys with character Insert and character A in the target model, that is, the same characters are chosen to calculate the first spatial distance on the keyboard as are chosen to calculate the second spatial distance on the target space. Although the example here only identifies one key in each preset area and calculates the distance between them, it is possible to identify two or more keys to ensure the accuracy of the calculation.

For the mouse, according to the component identified above, the second spatial distance from the same component above can also be calculated in the target model (similar 3D model) accordingly, such as the second spatial distance between left key 1 and left key 2, and between left key 1 and right key 1 in the target model, that is, the same components are chosen to calculate the first spatial distance on the mouse as are chosen to calculate the second spatial distance on the target space.

S430 includes if the difference between the first spatial distance and the second spatial distance is bigger or greater than the preset threshold, determining the position relation of the preset area in which at least one key corresponding to the keyboard resides based on the first spatial distance and the second spatial distance, i.e., determining the position relation of two keys or two corresponding characters in different preset area (for example, a character or number in the number key area and a different character in the main keyboard area or direction area) based on the first spatial distance and the second spatial distance. Updating the target model according to the position relation of the preset area.

On the basis of S410 and S420 above, if the calculated second spatial distance between the keys with character/number 4 and character A in the target model is 5 and the calculated first spatial distance between these keys on the physical keyboard in the image is 7, whether the difference 2 between the first and the second spatial distance is bigger than the preset threshold should be calculated. The preset threshold can be set according to user requirements. For example, the preset threshold is 1. The difference 2 is bigger than the preset threshold 1, so the similar 3D model should be adjusted. The spatial distance between the number key area and the main keyboard area in the similar 3D model should be adjusted according to the second spatial distance 5 and the first spatial distance 7. The spatial distance between the center point of the pre-determined number key area and the center point of the main keyboard area should be adjusted to 7 in the similar 3D model, and other characters and keys in the key area should be adjusted accordingly, that is, the spatial distance between 2 key areas should be increased. The spatial distance between other key areas is adjusted in the same way as that between the number key area and the main keyboard area, which will not be repeated here. After the spatial distance of each key area is adjusted, the updated target model matching the keyboard can be acquired, or the target model more matching the keyboard can be acquired. More matching means that there is a small gap in the position relation between keys and between key areas, that is, the spatial layout of the adjusted target model matches the spatial layout of the keyboard. It can also be understood as generating a 3D model matching the keyboard based on a similar 3D model, which avoids key dislocation caused by the poor matching between the physical keyboard and the 3D model. For example, the user presses the key D in real space, but the hand model displayed in the virtual reality scene presses the key E on the 3D model because of the poor matching between the physical keyboard and the 3D model. Such situation is easy to mislead the user and the input is inaccurate. No adjustment is required if the overall shape of the 3D model is different.

Alternatively, the updated target model can be projected into the virtual reality scene constructed by virtual reality system based on the target information.

Identifying at least one key in each key area of the keyboard mentioned above means that if the keyboard has 5 key areas, at least 5 keys with 5 characters should be identified. The target information of the updated target model in the virtual reality can be determined based on the position of at least one key in each key area in the 3D model. The updated target model is the corresponding 3D model of the keyboard, and can be projected into the virtual reality scene.

S440 includes: if the difference between the first spatial distance and the second spatial distance is less than or equal to the preset threshold, determining the target model as the corresponding 3D model of the keyboard. On the basis of S430 above, if the calculated second spatial distance between the keys with character/number 4 and character A in the target model is 6.5 and the calculated first spatial distance between the keys with character/number 4 and character A on the physical keyboard in the image is 7, the difference 0.5 between the first and the second spatial distance will be less than the preset threshold 1. For another example, if the first spatial distance between the keys with character Insert in the control key area and character/number 4 in the number key area on the physical keyboard is 3 and the second spatial distance between the keys with character Insert in the control key area and character/number 4 in the number key area in the similar 3D model is 2.5, the difference 0.5 between the first spatial distance 3 and the second spatial distance 2.5 will be less than the preset threshold 1. If the spatial distance difference between keys in other key areas is also less than the preset threshold, it indicates that the similarity between the target model and the keyboard is relatively high. In this case, the target model with high similarity can be directly selected as the corresponding 3D model of the keyboard, without the need to adjust the target model.

An input device model projecting method provided in this disclosed embodiment includes: if there is no 3D model matching the input device in the pre-built model database (preset database), determining the 3D model similar to that of the input device (target model), and then adjusting the similar 3D model based on the distribution of keys in each key area of the input device and the position relation between keys in the key areas, so as to make the input device highly match the 3D model. The method is flexible and can be applied to a variety of application scenes. For example, if there is no 3D model corresponding to the input device of the model in the preset database, the target model can be adjusted. In addition, the method is efficient to implement. Or, when the similarity between the target model and the input device is high, that is, the spatial distance difference between the key areas is small, the target model can be directly determined as the corresponding 3D model of the input device.

Figure 5:
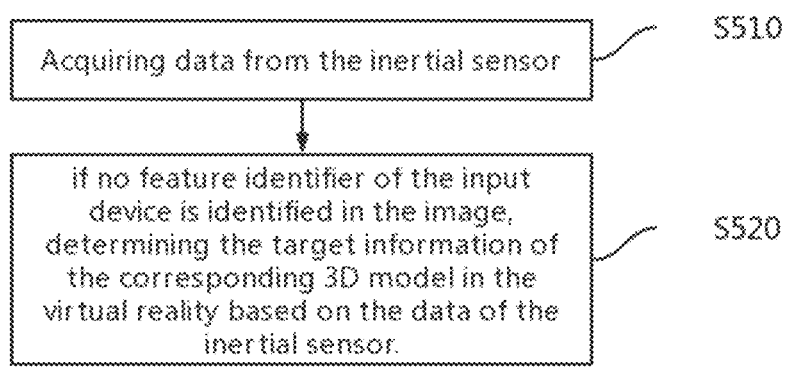
FIG. 5 illustrates a flow diagram of an input device model projecting method provided in one disclosed embodiment.

On the basis of the embodiment above, FIG. 5 illustrates is a flow diagram of an input device model projecting method provided in this disclosed embodiment. Alternatively, if the input device is blocked in a large range in the image captured by the camera of the virtual reality system and no feature identifier can be collected, the following steps S510 to S520 shown in FIG. 5 can be performed.

Alternatively, the input device is preconfigured with an inertial sensor. The input device is preconfigured with an inertial sensor, which can collect data about the input device in real time, and can be mounted on the surface of the input device as a separate device or installed in the internal circuit of the input device. For example, the inertial sensor could be placed under the keys of the keyboard.

S510 includes acquiring data from the inertial sensor. The data collected by the inertial sensor can be acquired. When the image identification method cannot determine the target information of the corresponding 3D model of the input device, the data collected by the inertial sensor at the time of image capturing can be acquired.

S520 includes if no feature identifier of the input device is identified in the image, determining the target information of the corresponding 3D model in the virtual reality based on the data of the inertial sensor. On the basis of S510 above, if there is large-scale blocking in the acquired image, such as blocking of photos captured in real time by hands or incorrect angle of capturing, the virtual reality system cannot identify the feature identifier on the input device in the image, the locating information of the input device can be acquired through IMU, and then the target information of the input device in the target space can be determined according to the locating information.

If there is large-scale blocking in the acquired image, the virtual reality system can also receive the input signal from the input device, and then determine the target information of the input device based on the input signal.

The camera captures images of the input device in real time. When the spatial position of the input device changes, the 3D model displayed in the virtual reality scene will also change accordingly.

An input device model projecting method provided in this embodiment disclosed embodiment includes, if there is large-scale blocking in the acquired image, and the virtual reality system cannot identify the key on the input device in the image, determining the target information of the input device corresponding to the virtual reality based on the data from the inertial sensor or by receiving the input signal from the input device, so as to ensure that the corresponding 3D model of the input device can be displayed accurately and in real time in the virtual reality scene. This method avoids the problem that users cannot determine the position of the input device in reality and improves user experience.

Figure 6:
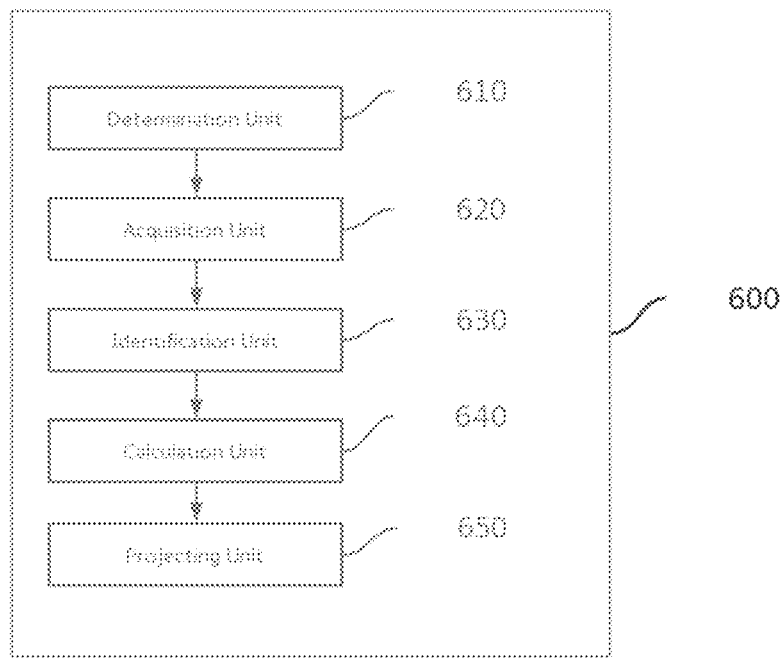
FIG. 6 illustrates a structure diagram of an input device model projecting apparatus provided in one disclosed embodiment.

FIG. 6 illustrates a structure diagram of an input device model projecting apparatus provided in one embodiment. The input device model projecting apparatus provided in one disclosed embodiment can execute the processing steps provided in the above input device model projecting method. As shown in FIG. 6, apparatus 600 comprises a determination unit 610 which is used to determine the corresponding 3D model of the input device.

The apparatus 600 includes an acquisition unit 620 which is used to acquire the image of the input device captured by the camera of the virtual reality system.

The apparatus 600 includes an identification unit 630 which is used to identify at least one feature identifier of the input device in the image.

The apparatus 600 includes a calculation unit 640 which is used to calculate the target information corresponding to at least one feature identifier in the virtual reality.

The apparatus 600 also includes a projecting unit 650 which is used to project the 3D model to the virtual reality scene constructed by the virtual reality system based on the target information. The term "projecting unit" is interchangeable with or could also be described as "mapping unit" in the present disclosure.

Alternatively, the determination unit 610 is used for acquiring configuration information, such as model information, of the input device and determining the 3D model of the input device according to the model information.

Alternatively, if there is a same model as that of the input device in the preset database according to the model information, determination unit 610 is used for determining the 3D model of the input device based on the model in the preset database.

However, if there is no same model as that of the input device in the preset database, determination unit 610 is used for calculating the similarity between the model stored in the preset database and the model of the input device and determining whether the similarity is less than or equal to the preset value. If yes, determining the corresponding 3D model of the input device based on the model corresponding to the similarity in the preset database. By contrast, if the similarity is bigger than the preset value, determining the target model in the preset database.

Alternatively, for determination unit 610, the input device includes a keyboard, and a feature identifier of the keyboard is a key.

Alternatively, if the similarity is bigger than the preset value identification unit 630 is used for identifying at least one key in each preset area of the keyboard in the image.

Alternatively, apparatus 600 also includes the updating unit, which is used for calculating the first spatial distance between identified keys in the preset areas of the keyboard and calculating the second spatial distance of the same keys above in the target model.

If the difference between the first and the second spatial distance is bigger than the preset threshold, determining the position relation of each preset area above based on the first spatial distance and the second spatial distance. And then updating the target model according to the position relation of the preset area. Or, if the difference between the first spatial distance and the second spatial distance is less than or equal to the preset threshold, determining the target model as the existing 3D model of the keyboard in the preset database and no adjustments are needed.

Alternatively, for determination unit 610, the input device also includes a mouse, and the feature identifier of the mouse is a component.

Alternatively, if the similarity is bigger than the preset value, identification unit 630 is used for identifying at least one component of the mouse in the image.

Alternatively, projecting unit 650 is used for projecting the updated target model to the virtual reality scene constructed by the virtual reality system based on the target information.

Alternatively, calculation unit 640 is used for obtaining the target information corresponding to the at least one feature identifier in the virtual reality through the spatial position algorithm.

Alternatively, the apparatus 600, the target information includes position and attitude.

Alternatively, for the first preset amount of feature identifiers, calculation unit 640 is used for acquiring the image of the same feature identifier captured simultaneously by at least two cameras from different angles, and determining the attitude of the same feature identifier based on the image of the same feature identifier from different angles.

For the second preset amount of feature identifiers, calculation unit 640 is used for determining the roll angle and pitch angle of the polygon formed by at least three feature identifiers based on the position of at least three feature identifiers that are not in a straight line. Determining the yaw angle of the polygon based on the orientation of the polygon and the position relation between the polygon and the 3D model. The roll angle, pitch angle and yaw angle constitute the attitude of the polygon.

Alternatively, projecting unit 650 is used for determining the position and the attitude of the 3D model based on the target information and the position relation between at least one feature identifier and the 3D model and projecting the 3D model into the virtual reality scene corresponding to the virtual reality system based on the position and the attitude of the 3D model.

Alternatively, for projecting unit 650, determining the position and the attitude of the 3D model based on the target information and the position relation between at least one feature identifier and the 3D model includes determining the position of the 3D model based on the position of a feature identifier and the position relation between the feature identifier and the 3D model.

Alternatively, for projecting unit 650, determining the position and the attitude of the 3D model based on the target information and the position relation between at least one feature identifier and the 3D model includes determining the attitude of the 3D model based on the attitude of a feature identifier and the position relation between the feature identifier and the 3D model, for the first preset amount of feature identifiers. For the second preset amount of feature identifiers, determining the attitude of the 3D model based on the attitude of the polygon and the position relation between the polygon and the 3D model.

Alternatively, for apparatus 600, the input device is preconfigured with an inertial sensor.

Alternatively, the apparatus 600 also includes an auxiliary acquisition unit, which is used for acquiring data from the inertial sensor and determining the target information of the corresponding 3D model of the input device in the virtual reality based on the data from the inertial sensor if no identifier of the input device is identified in the image.

Figure 7:
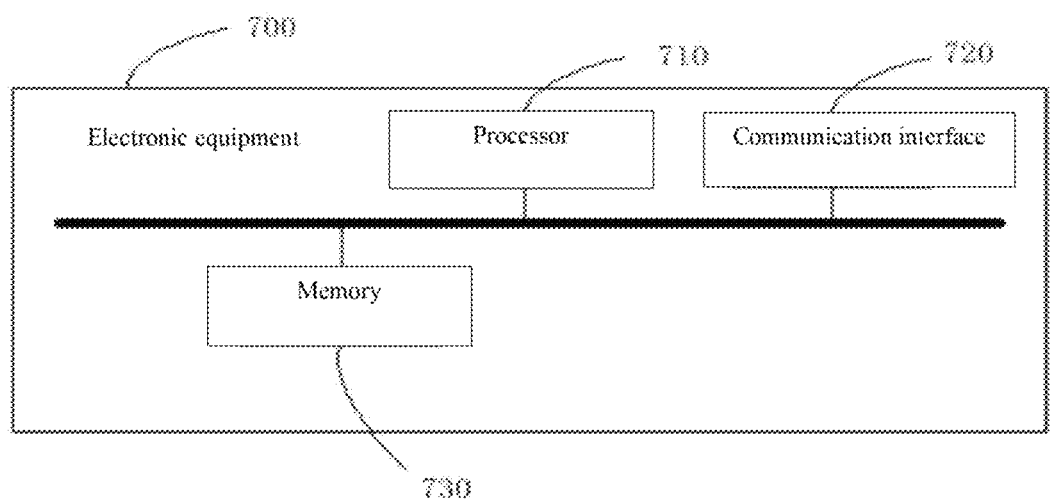
FIG. 7 illustrates a structure diagram of an electronic apparatus provided in accordance with some embodiments.

In accordance with some embodiments, FIG. 7 illustrates a structure diagram of an electronic apparatus. The electronic apparatus can execute the operations provided in some embodiments. As shown in FIG. 7, the electronic apparatus 700 includes processor 710, communication interface 720 and memory 730. The computer program is stored in memory 730 and configured for processor 710 to perform the input device model projecting method as described in some embodiments.

One disclosed embodiment provides a computer readable storage medium storing a computer program which is executed by the processor to perform the input device model projecting method in one embodiment.

Figure 8:
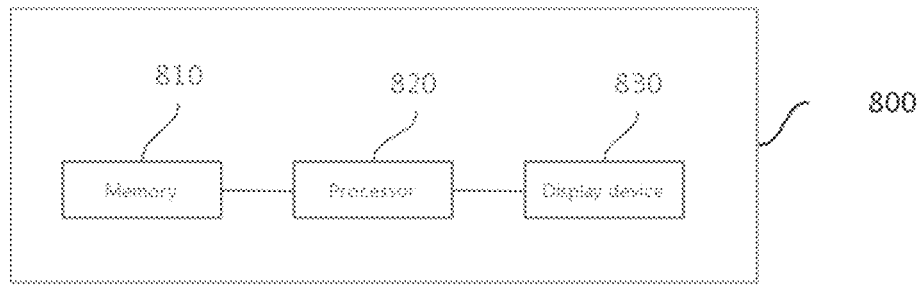
FIG. 8 illustrates a structure diagram of an electronic apparatus provided in accordance with some embodiments.

In accordance with some embodiments, FIG. 8 illustrates a structure diagram of an electronic apparatus provided. As shown in FIG. 8, the electronic apparatus 800 includes one or more processor 810, a memory 820 and a display device 830. In addition, a plurality of programs for projecting a virtual reality (VR) model is stored in the memory 820 and when those programs are executed by the one or more processors 810, the electronic apparatus performs acts as described in some embodiments and displays the 3D model in the virtual reality scene by the display device.

Figure 9:
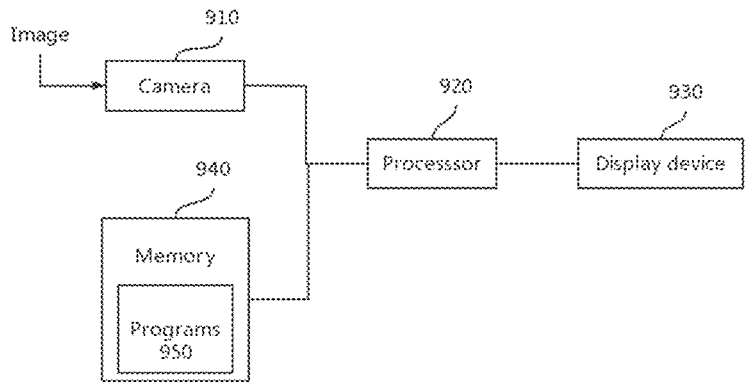
FIG. 9 illustrates a structure diagram of a virtual reality system in one disclosed embodiment.

In accordance with some embodiments, FIG. 9 illustrates a structure diagram of a virtual reality system. As shown in FIG. 9, the virtual reality system includes a display device 930 configured to display the virtual reality scene and projected 3D model, and a plurality of cameras 910 configured to capture images of the input device. The virtual reality system also includes the electronic apparatus coupled with the one or more processors 920, memory 940 coupled to the one or more processors and a plurality of programs 950 for projecting a virtual reality (VR) model stored in the memory that, when executed by the one or more processors 920, cause the electronic apparatus to perform acts in some embodiments One disclosed embodiment provides a model display method. Such method includes: acquiring the hand location of the hand model corresponding to the hand in real space in the virtual reality, displaying the hand model, receiving the input signal from the input device, determining the key position in the 3D model of the input device, then determining model location of the 3D model in the virtual reality, and displaying the 3D model at the model location in the virtual reality constructed by virtual reality system.

The term "hand location" and the term "first locating information of the hand model" have the same meaning in the present disclosure. The term "model location of the 3D model" and the term "second locating information of the said 3D model" have the same meaning in the present disclosure.

Figure 10:
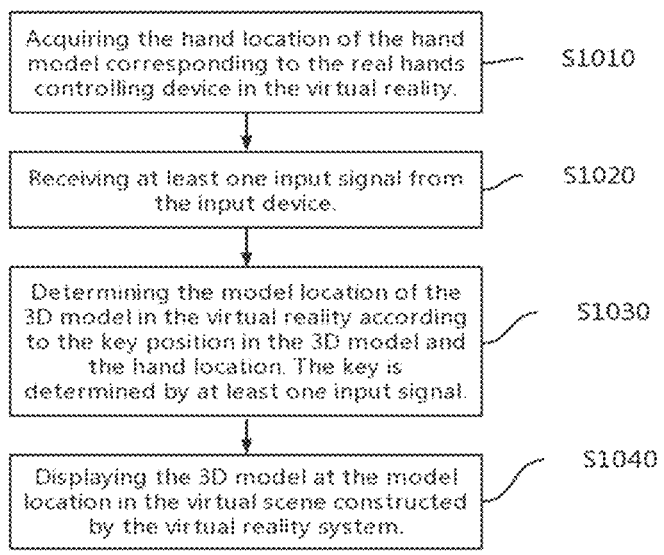
FIG. 10 illustrates a flow diagram of a model display method provided in one disclosed embodiment.

FIG. 10 illustrate a flow diagram of a model display method provided in accordance with some embodiments. Steps S1010 to S1040 shown in FIG. 10 are included in the model display method provided in accordance with some embodiments.

S1010 includes acquiring the hand location of the hand model corresponding to the real hands controlling device in the virtual reality.

Image identification in related technologies or hand tracking equipment can be used to determine the hand location of the hand model in the virtual reality. The hand tracking equipment can be worn on the user's hands, and is subject to no restriction, as long as it can construct a complete hand model according to the hand contour, display the hand posture and determine the hand location of the hand model in the virtual reality. The devices in this disclosure include but not limit to such devices. The virtual reality system can construct the hand model according to the hand model information, and then display the hand model in the virtual reality constructed by the virtual reality system according to the hand location. Hand location includes position and attitude.

S1020 includes receiving at least one input signal from the input device. On the basis of S1010, the virtual reality system receives at least one input signal from the keyboard. Input signal refers to the signal generated when each key on the keyboard is pressed or released. The signals generated by the keys are different, that is, each key on the keyboard has a corresponding signal. The virtual reality system can determine the key that generates the received signal.

S1030 includes determining the model location of the 3D model in the virtual reality according to the key position in the 3D model and the hand location. The key is determined by at least one input signal.

Alternatively, before the model location in the virtual reality is determined, it is necessary to determine the 3D model of the input device. Such operations include: acquiring the configuration information of the input device and determining the 3D model of the input device based on the model information.

After the keyboard model is determined, each key position on the keyboard model is determined. The position of each key on the keyboard model is fixed or can be determined, including the size of keys on the keyboard model, the spatial distance between keys, and the relative position of each key. The position could also be the spatial distance between a key and a preset identifier and the relative position of the key to the preset identifier. A preset identifier can be set up in advance on the keyboard. There is no restriction on the position of preset identifiers on the keyboard. For example, preset identifiers can be white dots. The distance between keys on the corresponding 3D model of the keyboard of each model and the direction of each key are fixed. For example, regardless of the position and attitude of the keyboard model, the spatial distance between key A and key W is fixed, and the relative position of key W diagonally above key A is also fixed.

Alternatively, determining the model location of the 3D model in the virtual reality according to the key position corresponding to at least one input signal in the 3D model of the input device and the hand location includes: determining the spatial position of the 3D model according to the key position in the 3D model and the spatial position in the hand location. Determining the attitude of the 3D model according to the preset amount of hand locations and the preset amount of key positions in the 3D model. And then determining the model location of the 3D model in the virtual reality according to the spatial position and the attitude of the 3D model.

The hand location of the hand model in the virtual reality (the target space) mentioned above could be acquired when the finger presses the key in real space. Since the finger in the hand model also performs the pressing operation, the spatial position of the pressed key in the target space can be acquired according to the spatial position in the hand location of the finger in the hand model in the target space based on the preset rules. Every time a finger presses a key, there will be an input signal. According to the input signal, the pressed key can be determined, and then the spatial position of the key in the target space can be determined. After the spatial position of any key is determined, the spatial position of the whole 3D model can be determined according to the key position in the 3D model and the spatial position of the key.

After the spatial position of the keyboard is determined, the attitude of the keyboard in the target space should be determined. It is mainly to determine the plane in which the keyboard resides and the orientation of the keyboard, that is, to determine the plane in which the 3D model resides and the orientation of the 3D model. Particularly, the attitude of the 3D model is determined according to the hand locations and the positions of the key corresponding to the preset amount of input signals in the 3D model. Attitude includes roll angle, pitch angle and yaw angle. The preset amount can be the first number or the second number, where the former refers to 3 or more keys, and the latter refers to fewer than 3 keys.

After the attitude and spatial position of the 3D model are determined, the model location of the whole 3D model in the target space can be determined according to the attitude and spatial position of the 3D model.

S1040 includes displaying the 3D model at the model location in the virtual reality constructed by the virtual reality system. On the basis of S1040 above, after the model location in the virtual reality is determined, the keyboard model can be projected into the virtual reality constructed by the virtual reality system. In the virtual reality, the position and attitude of the 3D model in the target space are the same as those of the keyboard (physical keyboard) in real space. Users can determine the situation of the physical keyboard in real space based on the state of the keyboard model in the virtual reality scene displayed on the display screen of the head-mounted display, and then control the physical keyboard to achieve rapid text input or other functions.

Alternatively, after the 3D model is displayed, the method also includes: if at least one input signal is received from the input device, displaying the effect of control over the key pressed by hand in real space in the 3D model.

After the 3D model is displayed in the virtual reality, as the user uses the input device in reality, such as pressing a key of the input device, the key will generate an input signal. After receiving the input signal, the virtual reality system will display the control action over the pressed key in the 3D model.

The 3D model projecting method provided in accordance with some embodiments can accurately project the 3D model of the input device in real space into the virtual reality. It is a simple way that can minimize the influence of blocking without installing other equipment.

Figure 11:
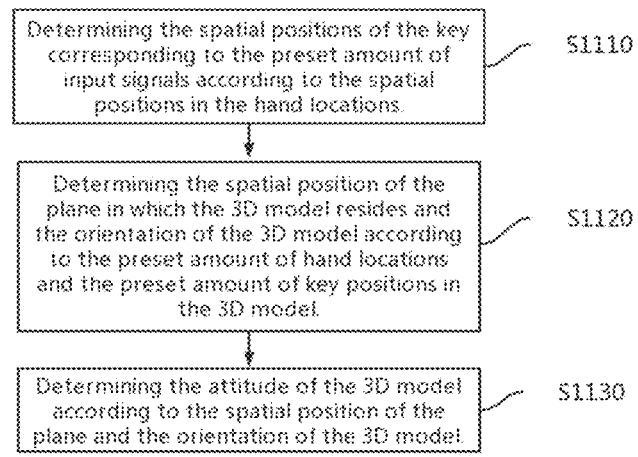
FIG. 11 illustrates a flow diagram of a model display method provided in one disclosed embodiment.

On the basis of some embodiments, FIG. 11 illustrates a flow diagram of a model display method.

Alternatively, determining the attitude of the 3D model according to the preset amount of hand locations and key positions in the 3D model further includes the following steps from S1110 to S1130 shown in FIG. 11.

S1110 includes determining the spatial positions of the key corresponding to the preset amount of input signals according to the spatial positions in the hand locations.

When a key is pressed by a hand, an input signal will be generated. According to the spatial position in the hand location of the hand model at this time, the spatial position of the key can be determined. Particularly, a preset amount of keys can be pressed with hands to generate a preset amount of input signals. The preset amount can be the first number or the second number. For example, when a key is pressed with a fingertip, the spatial position of the fingertip in the hand model can be approximately the same as the spatial position of the key. Multiple keys can be pressed with hands at the same time or only one key can be pressed with a hand at a time. There is no restriction on how to press the key. If there are keys that can be pressed, the keyboard with keys is facing up by default.

S1120 includes determining the spatial position of the plane in which the 3D model resides and the orientation of the 3D model according to the preset amount of hand locations and the preset amount of key positions in the 3D model.

Alternatively, S1120 above includes: if the preset amount is the first number, determining the spatial position of the plane in which the 3D model resides according to the spatial position in the preset amount of hand location; determining the orientation of the 3D model, in accordance with an orientation of a polygon formed by the first number of non-conllinear keys, a spatial position and a position in the 3D model of each key in the polygon.

The word "non-conllinear" described a state that somethings are not lying or acting in the same straight line. Non-conllinear keys in the present disclosure refer to keys that are not in the same line. In other words, the connecting between these keys could form a polygon, instead of a line.

On the basis of S1110 above, if the preset amount is the first number, which is 3 or more, taking 3 keys pressed as an example, the spatial position of the plane in which the keyboard resides can be determined according to the spatial position of the 3 keys that are not in a straight line. The spatial position of the plane in which the keyboard resides is also the spatial position of the plane in which the 3D model resides, and the spatial position of the plane in which the 3D model resides includes the roll angle and pitch angle of the 3D model. Then, the orientation of the 3D model can be determined according to the orientation of the triangle (polygon) formed by the 3 non-conllinear keys, the spatial positions of the 3 keys and the positions of the 3 keys in the 3D model. The orientation of the 3D model includes the yaw angle of the 3D model.

Alternatively, S1120 above includes: if the preset amount is the second number, determining a target part for pressing a second number of keys in the hand model; determining a spatial position of the plane in which the target part resides and an orientation of the target part according to the attitude in the hand location of the hand model; calculating and determining the spatial position of the plane in which the 3D model resides based on the spatial position of the plane in which the target part resides; and determining an orientation of each key in the second number of keys according to the orientation of the target part; and determining the orientation of the 3D model based on the orientation of each key and a position of each key in the 3D model in the second number of keys.

On the basis of S1110 above, if the preset amount is the second number, the second number of keys can be 1 and/or 2 keys. After key A is pressed with a finger, the acquired hand location includes the spatial position of the finger at the time of pressing key A. In the following example, 1 key A is pressed. For determining the target part for pressing the second number of keys in the hand model, the target part can be the pad of the finger pressing the key. For example, if key A is pressed with the right index finger, the pad of the right index finger will be recorded as the target part. The target part can also be the finger joint. Then the spatial position of the plane in which the target part resides can be determined according to the attitude of the target part in the hand location, and the spatial position of the plane in which the pad of the finger resides can be calculated to determine the spatial position of the plane in which the keyboard is placed. The spatial position of the plane in which the keyboard is placed includes roll angle and pitch angle. There is no restriction on the specific calculation method. Finally, the orientation of the pressed key A can be determined according to the orientation of the fingertip pressing key A in the hand location. For example, if the keyboard faces the user, the fingertip will be diagonally downward when the user presses key A. When the keyboard is in a different position, the orientation of the fingertip will be different. The orientation of the 3D model can be determined based on the orientation of key A and the position of key A in the 3D model.

S1130 includes determining the attitude of the 3D model according to the spatial position of the plane and the orientation of the 3D model. On the basis of S1120 above, the attitude of the 3D model in the virtual reality can be determined according to the spatial position of the plane in which the 3D model resides and the orientation of the 3D model.

Figure 12:
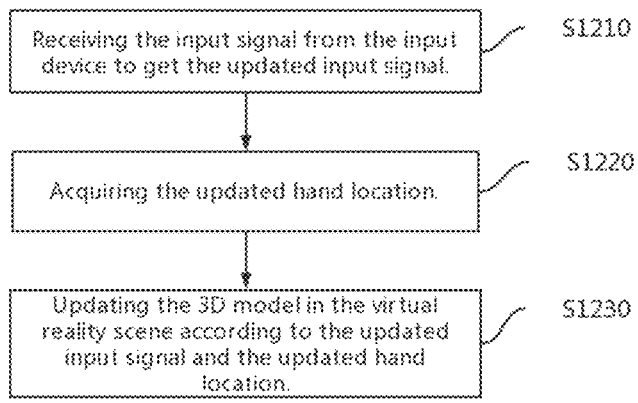
FIG. 12 illustrates a flow diagram of a model display method provided in one disclosed embodiment.

In accordance with some embodiments, FIG. 12 illustrates a flow diagram of a model display method.

Alternatively, after the 3D model is displayed at the model location in the virtual reality constructed by the virtual reality system, the method also includes the following steps S1210 to S1230 shown in FIG. 12.

S1210 includes receiving the input signal from the input device to get the updated input signal. After the keyboard model is projected into the virtual reality scene, the input signal from the keyboard can be received in real time for adjustment of the attitude and position of the keyboard model in the virtual reality scene at any time, so as to ensure that the model display state in the virtual reality scene is synchronized with the state of the keyboard in real space.

S1220 includes acquiring the updated hand location. After the hand location in the virtual reality is acquired in real time, the hand location in the virtual reality can be updated according to the acquired updated locating information of the user's hands. Updating hand model refers to updating the state of the hand model in the virtual reality scene, including the state of each finger of the user's hands. For example, if the left user's hand has shifted, the state of the left hand in the virtual reality scene will change.

S1230 includes updating the 3D model in the virtual reality scene according to the updated input signal and the updated hand location. On the basis of S1210 and S1220 above, the updated keyboard model can be projected into the virtual reality scene according to the key position corresponding to the updated input signal in the keyboard model and the hand location of the updated hand model in the virtual reality. It can be understood that the keyboard model "jumps" with the hand model, and is "moved" to the hand location in the virtual reality.

The physical keyboard and the user's hands are constantly moving, and the data about the hands detected by the hand tracking equipment is generated in real time. The hand location in the target space can be determined in real time. Then according to the hand location in the target space, the keyboard model location in the target space can be determined. After the keyboard model is determined for the first time, if the keyboard is not replaced, the keyboard model may not be changed, and the location of the keys in the input signal can be determined directly, so as to speed up the updating of the display state of the keyboard model.

The keyboard model location in the target space can also be determined by the inertial sensor. The inertial sensor can collect real-time data about the keyboard, including the keyboard location.

Alternatively, after the 3D model is displayed at the model location in the virtual reality constructed by the virtual reality system, the method also includes: receiving the input signal from the input device; updating the state of the 3D model in the virtual reality scene according to the input signal, and displaying the control effect of the key in the virtual reality scene.

After the keyboard model is displayed in the virtual reality scene, the user can operate the keyboard by pressing or releasing a key on it. After receiving the input signal of the key, the virtual reality system will synchronously display the operation of pressing or releasing the key on the keyboard model, which means the state of the keyboard model in the virtual reality scene will be changed in real time according to the user's operation on the keyboard. At the same time, the corresponding character of the key will be displayed in the virtual reality scene, and subsequent operations will be performed based on the key with the character.

Figure 13:
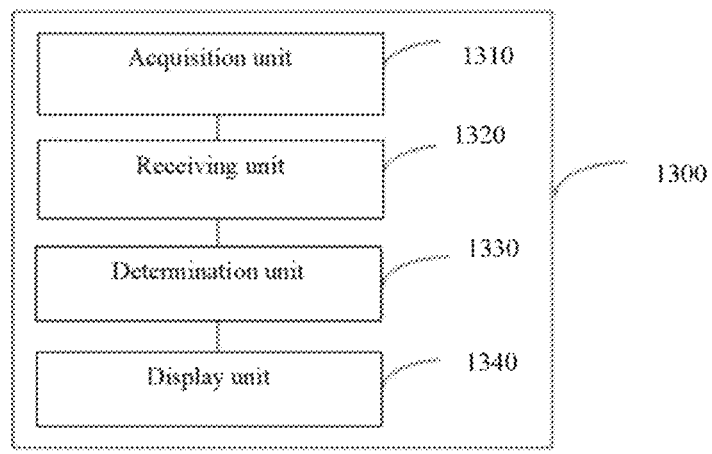
FIG. 13 illustrates a structure diagram of a model display apparatus provided in one disclosed embodiment.

FIG. 13 illustrates a structure diagram of a model display apparatus provided in some embodiments. The model display apparatus provided here can execute the operations provided in the seventh embodiment of the model display method. Apparatus 1300 includes an acquisition unit 1310 which is used to acquire the hand location of the hand model in the virtual reality.

The apparatus 1300 includes a receiving unit 1320 which is used to receive the at least one input signal from the input device.

The apparatus 1300 includes a determination unit 1330, which is used to determine the model location of the 3D model in the virtual reality.

The apparatus 1300 also includes a projecting unit 1340 which is used to display the 3D model at the model location in the virtual reality constructed by the virtual reality system.

Alternatively, determination unit 1330 is used for determining the spatial position of the 3D model according to the key position of in the 3D model of the input device and the spatial position in the hand location, determining the attitude of the 3D model according to the preset amount of hand locations and key positions in the 3D model and determining the model location of the 3D model in the virtual reality according to the spatial position and the attitude of the 3D model.

Alternatively, determination unit 1330 is used for determining the spatial position of the keys corresponding to the preset amount of input signals according to the spatial positions in the hand locations, determining the spatial position of the plane in which the 3D model resides and the orientation of the 3D model according to the preset amount of hand locations and the keys positions in the 3D model and determining the attitude of the 3D model according to the spatial position of the plane and the orientation of the 3D model.

Alternatively, if the preset amount is the first number, determination unit 1330 is used for determining the spatial position of the plane in which the 3D model resides according to the spatial positions in the first number of hand locations and determining the orientation of the 3D model based on the orientation of the polygon formed by the first number of keys, the first number of spatial positions and the positions in the 3D model of the keys in the polygon.

Alternatively, if the preset amount is the second number, determination unit 1330 is used for determining the target part for pressing the second number of keys in the hand model, determining the spatial position of the plane in which the target part resides and the orientation of the target part according to the attitude in the hand location, calculating and determining the spatial position of the plane in which the 3D model resides based on the spatial position of the plane in which the target part resides and determining the orientation of each key in the second number of keys in accordance with the orientation of the target part; and determining the orientation of the 3D model based on the orientation of each key and the position of each key in the 3D model in the second number of keys.

Alternatively, apparatus 1300 also includes an effect unit, which, after the 3D model is displayed, is used for displaying the subsequent control action to the input device Alternatively, apparatus 1300 also includes an updating unit, which, after the 3D model is displayed at the model location in the virtual reality constructed by the virtual reality system, is used for receiving the input signal from the input device to get the updated input signal; acquiring the updated hand location; and updating the 3D model in the virtual reality scene according to the updated input signal and the updated hand location.

Figure 14:
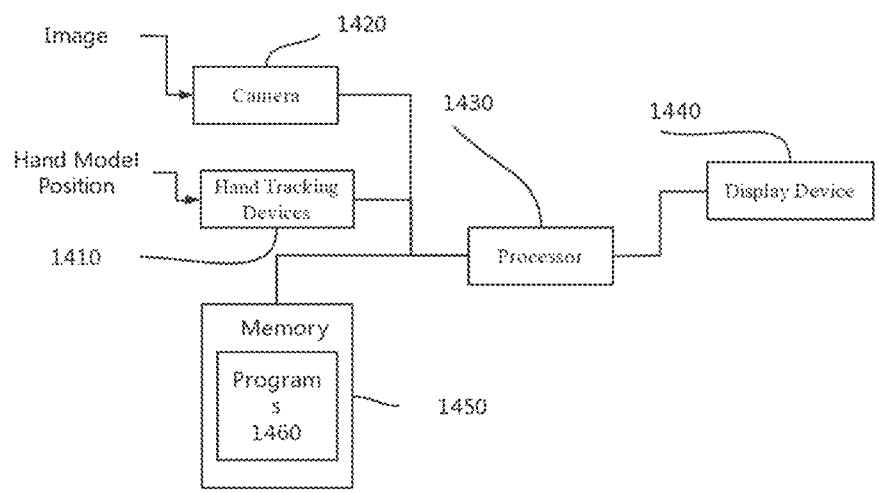
FIG. 14 illustrates a structure diagram of a virtual reality system in one disclosed embodiment.

In accordance with some embodiments, FIG. 14 illustrates a structure diagram of a virtual reality system provided. As shown in FIG. 14, the virtual reality system 1400 includes: a display device configured to display 1440 the virtual reality scene and projected 3D model; a plurality of cameras 1420 configured to capture images of the surrounding environment; one or more hand tracking devices 1410 configured to track the hand location in the virtual reality; and the electronic apparatus coupled with the one or more processors 1430, memory 1450 coupled to the one or more processors 1430 and a plurality of programs 1460 for projecting a virtual reality (VR) model stored in the memory that, when executed by the one or more processors 1430, cause the electronic apparatus to perform acts in some embodiments.

The model display method provided in some embodiments of the present disclosure enables the rapid and accurate display of the input device 3D model by capturing the image of the hand pressing the key. Such method does not need to capture the images of the input device and avoid the adverse influence of blocking the input device by hands and the need to install external devices. The method can be quickly put into practical application, significantly improves convenience, and facilitates subsequent efficient interaction using the input device according to the 3D model displayed in the virtual reality scene.

In the present disclosure, relational terms such as "first" and "second" are used only to distinguish one entity or operation from another, and do not necessarily require or imply any such actual relation or sequence between the entities or operations. Furthermore, the term "comprises," "contain," "include" or any of its other variants is intended to cover a non-exclusive inclusion.

What is claimed is:

1. A method for projecting an input device model, comprising:
  identifying a three-dimension (3D) model of an input device, wherein the input device comprises a keyboard and a mouse;

acquiring an image of the input device captured by a camera in a virtual reality (VR) system;

identifying at least one feature identifier of the input device in the image;

calculating target information in the VR system corresponding to the at least one feature identifier; and projecting, according to the target information, the 3D model into a VR scene constructed by the VR system such that the input device and the VR scene interact with each other, wherein the target information comprises a position and an attitude, and wherein calculating the target information in the VR system corresponding to the at least one feature identifier comprises:

in response to determining that an amount of the at least one feature identifier is a first amount, acquiring images of a feature identifier captured simultaneously by at least two cameras at different angles and determining the attitude of the feature identifier based on the images of the feature identifier at the different angles; or in response to determining that the amount of the at least one feature identifier is a second amount, determining a roll angle and a pitch angle of a polygon formed by at least three non-conllinear feature identifiers based on a position of each feature identifier in the polygon and determining a yaw angle of the polygon according to an orientation of the polygon and a position relationship between the polygon and the 3D model, wherein the roll angle, the pitch angle and the yaw angle constitute the attitude of the polygon.

2. The method according to claim 1, wherein identifying the 3D model of the input device comprises:

acquiring configuration information of the input device, wherein the configuration information comprises model information; and identifying the 3D model according to the model information.

3. The method according to claim 2, wherein identifying the 3D model according to the model information comprises:

determining if there is a same model as the input device in a preset database according to the model information; and in response to determining that there is the same model, identifying the 3D model as the same model in the preset database; or in response to determining that there is no same model as the input device in the preset database, calculating a similarity between a model in the preset database and the model of the said input device and determining whether the similarity is smaller than or equal to a preset value, in response to determining that the similarity is smaller than or equal to the preset value, identifying the 3D model as a model corresponding to the similarity in the preset database, and in response to determining that the similarity is greater than the preset value, identifying the 3D model as a target model in the preset database.

4. The method according to claim 3, wherein a feature identifier of the keyboard is a key, and wherein identifying the at least one feature identifier of the input device in the image comprises:

in response to determining that the similarity is greater than the preset value, identifying at least one key in a preset area in the keyboard in the image.

5. The method according to claim 4, further comprising:

calculating a first spatial distance between two keys in the preset area;

calculating a second spatial distance between two keys in the target model;

in response to determining that a difference between the first spatial distance and the second spatial distance is greater than a preset threshold, determining a position relation of two keys in different preset area and updating the target model according to the position relation; or in response to determining that the difference between the first spatial distance and the second spatial distance is smaller or equal to the preset threshold, determining the target model as the 3D model corresponding to the keyboard.

6. The method according to claim 5, wherein projecting, according to the target information, the 3D model into the VR scene constructed by the VR system comprises:

projecting, according to the target information, the target model that is updated into the VR scene constructed by the VR system.

7. The method according to claim 3, wherein one or more feature identifiers corresponding to the mouse comprise at least one component, and wherein identifying the at least one feature identifier of the input device in the image comprises:

in response to determining that the similarity is greater than the preset value, identifying the at least one component of the mouse in the image.

8. The method according to claim 1, wherein calculating target information in the VR system corresponding to the at least one feature identifier comprises:

calculating the target information of the at least one feature identifier in the VR system through a spatial position algorithm.

9. The method according to claim 1, wherein projecting, according to the target information, the 3D model into the VR scene constructed by the VR system comprises:

determining the position and the attitude of the 3D model based on the target information and the position relationship between the at least one feature identifier and the 3D model; and projecting, according to the position and the attitude of the 3D model, the 3D model into the VR scene constructed by the VR system.

10. The method according to claim 9, wherein determining the position and the attitude of the 3D model based on the target information and the position relationship between the at least one feature identifier and the 3D model comprises:

determining the position of the 3D model based on a position of a feature identifier and the position relationship between the feature identifier and the 3D model.

11. The method according to claim 9, wherein determining the attitude of the 3D model based on the target information and the position relationship between the at least one feature identifier and the 3D model comprises:

in response to determining that the amount of the at least one feature identifier is the first amount, determining the attitude of the 3D model according to an attitude of a feature identifier and a position relationship between the feature identifier and the 3D model; and in response to determining that the amount of the at least one feature identifier is the second amount, determining the attitude of the 3D model according to the attitude of the polygon and the position relationship between the polygon and the 3D model.

12. An electronic apparatus comprising:
   one or more processors;
   a memory coupled to the one or more processors;
   a display device that is configured to display a virtual reality (VR) scene; and
   a plurality of programs for projecting a 3D model stored in the memory that, when executed by the one or more processors, cause the electronic apparatus to perform acts comprising:
      identifying the 3D model of an input device, wherein the input device comprises a keyboard and a mouse;
      acquiring an image of the input device captured by a camera in a virtual reality (VR) system;
      identifying at least one feature identifier of the input device in the image;
      calculating target information in the VR system corresponding to the at least one feature identifier; and
      projecting, according to the target information, the 3D model into the VR scene constructed by the VR system such that the input device and the VR scene interact with each other,
   wherein the target information comprises a position and an attitude, and wherein calculating the target information in the VR system corresponding to the at least one feature identifier comprises:
      in response to determining that an amount of the at least one feature identifier is a first amount, acquiring images of a feature identifier captured simultaneously by at least two cameras at different angles and determining the attitude of the feature identifier based on the images of the feature identifier at the different angles; or
      in response to determining that the amount of the at least one feature identifier is a second amount, determining a roll angle and a pitch angle of a polygon formed by at least three non-conllinear feature identifiers based on a position of each feature identifier in the polygon and determining a yaw angle of the polygon according to an orientation of the polygon and a position relationship between the polygon and the 3D model, wherein the roll angle, the pitch angle and the yaw angle constitute the attitude of the polygon.

13. The electronic apparatus according to claim 12, wherein identifying the 3D model of the input device comprises:
   acquiring configuration information of the input device, wherein the configuration information comprises model information; and
   identifying the 3D model according to the model information.

14. The electronic apparatus according to claim 13, wherein identifying the 3D model according to the model information comprises:
   determining if there is a same model as the input device in a preset database according to the model information; and
   in response to determining that there is the same model, identifying the 3D model as the same model in the preset database; or
   in response to determining that there is no same model as the input device in the preset database,
      calculating a similarity between a model in the preset database and the model of the said input device and determining whether the similarity is smaller than or equal to a preset value,
      in response to determining that the similarity is smaller than or equal to the preset value, identifying the 3D model as a model corresponding to the similarity in the preset database, and
      in response to determining that the similarity is greater than the preset value, identifying the 3D model as a target model in the preset database.

15. The electronic apparatus according to claim 14, wherein a feature identifier of the keyboard is a key, and
   wherein identifying the at least one feature identifier of the input device in the image comprises:
      in response to determining that the similarity is greater than the preset value, identifying at least one key in a preset area in the keyboard in the image.

16. The electronic apparatus according to claim 15, wherein the electronic apparatus is caused to perform acts further comprising:
   calculating a first spatial distance between two keys in the preset area;
   calculating a second spatial distance between two keys in the target model;
   in response to determining that a difference between the first spatial distance and the second spatial distance is greater than a preset threshold, determining a position relation two keys in different preset area in the preset area and updating the target model according to the position relation; or
   in response to determining that the difference between the first spatial distance and the second spatial distance is smaller or equal to the preset threshold, determining the target model as the 3D model corresponding to the keyboard.

17. The electronic apparatus according to claim 16, wherein projecting, according to the target information, the 3D model into the VR scene constructed by the VR system comprises:
   projecting, according to the target information, the target model that is updated into the VR scene constructed by the VR system.

18. The electronic apparatus according to claim 15, wherein one or more feature identifiers corresponding to the mouse comprise at least one component, and
   wherein identifying the at least one feature identifier of the input device in the image comprises:
      in response to determining that the similarity is greater than the preset value, identifying the at least one component of the mouse in the image.

19. The electronic apparatus according to claim 12, wherein calculating target information in the VR system corresponding to the at least one feature identifier comprises:
   calculating the target information of the at least one feature identifier in the VR system through a spatial position algorithm.

20. A non-transitory computer readable storage medium storing a plurality of programs for execution by an electronic apparatus having one or more processors, wherein the plurality of programs, when executed by the one or more processors, cause the electronic apparatus to perform acts comprising:
   identifying a 3D model of an input device, wherein the input device comprises a keyboard and a mouse;

acquiring an image of the input device captured by a camera in a virtual reality (VR) system;

identifying at least one feature identifier of the input device in the image;

calculating target information in the VR system corresponding to the at least one feature identifier; and projecting, according to the target information, the 3D model into a VR scene constructed by the VR system such that the input device and the VR scene interact with each other, wherein the target information comprises a position and an attitude, and wherein calculating the target information in the VR system corresponding to the at least one feature identifier comprises:

in response to determining that an amount of the at least one feature identifier is a first amount, acquiring images of a feature identifier captured simultaneously by at least two cameras at different angles and determining the attitude of the feature identifier based on the images of the feature identifier at the different angles; or in response to determining that the amount of the at least one feature identifier is a second amount, determining a roll angle and a pitch angle of a polygon formed by at least three non-conllinear feature identifiers based on a position of each feature identifier in the polygon and determining a yaw angle of the polygon according to an orientation of the polygon and a position relationship between the polygon and the 3D model, wherein the roll angle, the pitch angle and the yaw angle constitute the attitude of the polygon.

* * * * *